United States Patent
McDonald et al.

(10) Patent No.: US 7,508,178 B2
(45) Date of Patent: Mar. 24, 2009

(54) DELAY COMPENSATION FOR HYSTERETIC CONTROL

(75) Inventors: Brent A. McDonald, Round Rock, TX (US); Brian Patrick Johnson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 11/269,218

(22) Filed: Nov. 8, 2005

(65) Prior Publication Data
US 2007/0103126 A1      May 10, 2007

(51) Int. Cl.
*G05F 1/00* (2006.01)
(52) U.S. Cl. .......................... 323/271; 323/282
(58) Field of Classification Search ................ 323/280, 323/242, 222, 282–285
See application file for complete search history.

(56) References Cited

U.S. PATENT DOCUMENTS

| | | | |
|---|---|---|---|
| 4,456,872 A | 6/1984 | Froeschle | |
| 6,147,478 A | 11/2000 | Skelton et al. | |
| 6,348,780 B1 | 2/2002 | Grant | |
| 6,366,070 B1* | 4/2002 | Cooke et al. | 323/284 |
| 6,608,521 B1* | 8/2003 | Baldwin et al. | 330/10 |
| 6,724,596 B2 | 4/2004 | Wade | |
| 6,873,140 B2* | 3/2005 | Saggini et al. | 323/283 |
| 6,885,175 B2* | 4/2005 | Mihalka | 323/282 |
| 2003/0201760 A1* | 10/2003 | Umemoto et al. | 323/271 |
| 2004/0257048 A1* | 12/2004 | Chagny | 320/141 |
| 2005/0068017 A1* | 3/2005 | Lipcsei | 323/282 |

OTHER PUBLICATIONS

Song, et al., "Accuracy Analysis of Hysteretic Current-mode Voltage Regulator" National Semiconductor Corporation, 0-7803-8975, Jan. 2005, pp. 276-280, © 2005 IEEE.

* cited by examiner

*Primary Examiner*—Akm E Ullah
*Assistant Examiner*—Nguyen Tran
(74) *Attorney, Agent, or Firm*—Haynes and Boone, LLP (57) ABSTRACT

For controlling a direct current to direct current (DC-DC) converter, a controller individually switches a charge switch and a discharge switch to control a duty cycle, thereby providing a regulated DC output. A delay in switching each one of the charge and discharge switches results in a formation of a DC error in the regulated DC output. The controller adjusts the duty cycle by adding a delay compensation to substantially eliminate the DC error. The delay compensation substantially eliminates the DC error by decreasing an average value of the regulated DC output to offset an increase in the average value of the regulated DC output without the delay compensation.

20 Claims, 5 Drawing Sheets

DELAY COMPENSATION FOR HYSTERETIC CONTROL

BACKGROUND

The present disclosure relates to the field of power supplies for information handling systems, and more particularly to controlling a direct current to direct current (DC-DC) converter used in power supplies.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, entertainment, and/or global communications. In addition, information handling systems may include a variety of hardware and software components that may be configured to process, store, and communicate information and may include one or more computer systems, data storage systems, and networking systems.

Typically, IHS's are powered by a power supply system, which include an alternating current (AC) to direct current (DC) adaptor. The AC/DC adaptor receives an AC input and generates a DC output. The DC output is used to provide power to the IHS components such as a processor, memory, and rechargeable batteries. Since each of the system components may have unique voltage and/or power requirements, a conversion of the DC output may be required. Thus, the power supply system may also include a DC-DC converter for converting the DC output voltage level to multiple predefined lower DC voltage levels typically required by various components and/or sub-systems, including the processor.

Power consumed by loads such as processors is increasing from one technology generation to the next. The supply voltage required by the processors is also decreasing and is anticipated to fall below 1 Volt. The combination of lower voltages and higher currents make voltage regulation of the DC-DC converter a more challenging task. A typical approach for reducing transient voltage of the DC-DC converter includes increasing output capacitance and/or increasing the bandwidth of the DC-DC converter. A common method to increase the bandwidth of the DC-DC converter is use of hysteretic control (may also be referred to as on/off, bang-bang, and/or ripple control).

Thus, hysteretic control is a well known non-linear control technique that may increase bandwidth but at a reduced DC output voltage accuracy. A DC error is typically introduced by a delay in turning off and/or turning on of the converter switches. Delays may include propagation delays in the controller design, turn-on and/or turn-off delays in the switches, and designed dead-time control to prevent shoot through. The rate of increase of the regulated output voltage is generally not the same as the rate at which it decreases. This mismatch in "slopes" increases the average value of the regulated output voltage, thereby producing the DC error. Additionally, the DC error introduced by using hysteretic control may be substantial for lower voltage and higher current applications, thereby resulting in inaccurate DC output voltage.

Therefore, a need exists for an improved system to provide power to the IHS. More specifically, a need exists to develop tools and techniques for controlling voltage and/or current output of a DC-DC converter having reduced DC error. Accordingly, it would be desirable to provide for improved control of a DC-DC converter providing power to an IHS, absent the disadvantages found in the prior methods discussed above.

SUMMARY

The foregoing need is addressed by the teachings of the present disclosure, which relates to improved hysteretic control of a power supply system. According to one embodiment, a method for controlling a direct current to direct current (DC-DC) converter includes receiving a delay compensation as a predefined function of a time delay in switching a plurality of switches included in the DC-DC converter. The time delay results in forming a DC error in a regulated output of the DC-DC converter. A duty cycle of the DC-DC converter is adjusted by adding the delay compensation to substantially eliminate the DC error.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements.

As described earlier, a traditional approach to increase a bandwidth of a DC-DC converter is to use hysteretic control. However, an accuracy of the regulated DC output of the converter is reduced due to a DC error generated by the use of hysteretic control. There is a need for improving the accuracy while using hysteretic control. According to one embodiment, an improved controller of the DC-DC converter automatically adjusts a duty cycle by adding a delay compensation to substantially eliminate the DC error.

According to one embodiment, in a method and system for controlling a direct current to direct current (DC-DC) converter, a controller individually switches a charge switch and a discharge switch to control a duty cycle, thereby providing a regulated DC output. A delay in switching each one of the charge and discharge switches results in a formation of a DC error in the regulated DC output. The controller adjusts the duty cycle by adding a delay compensation to substantially eliminate the DC error. The delay compensation substantially eliminates the DC error by decreasing an average value of the regulated DC output to offset an increase in the average value of the regulated DC output without the delay compensation.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price. The information handling system may include random access memory (RAM), one or more processing resources such as central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to receive/transmit communications between the various hardware components.

Figure 1:
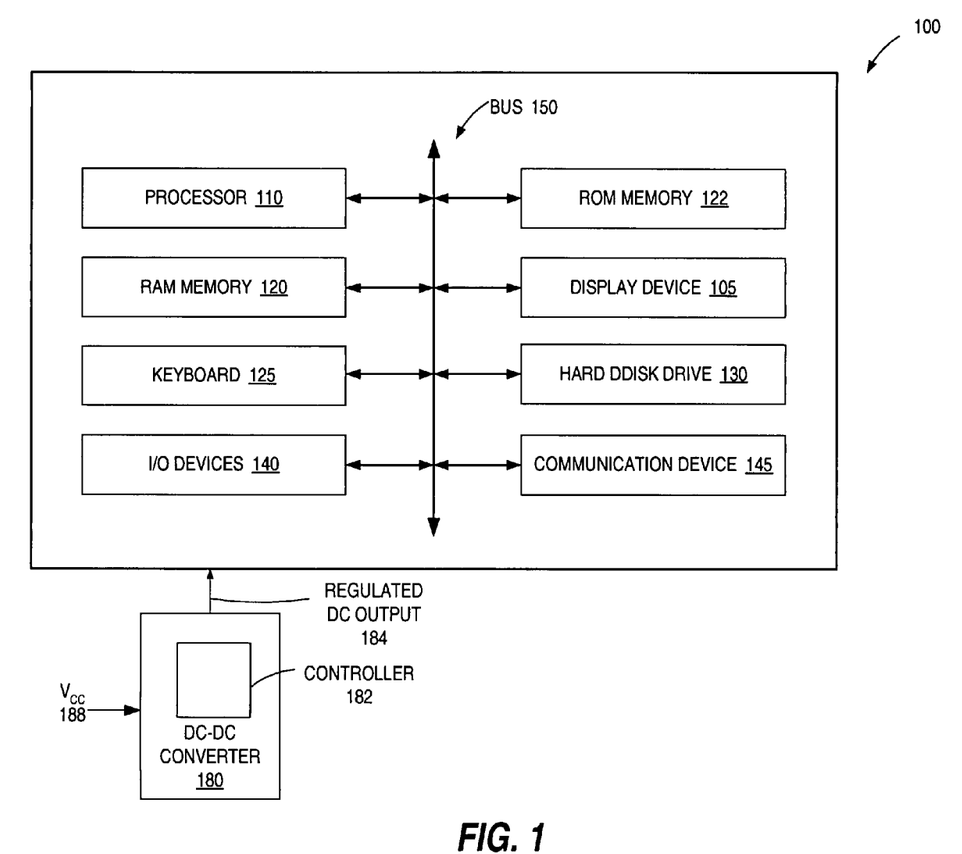
FIG. 1 illustrates a block diagram of an information handling system having an improved DC-DC converter, according to an embodiment.

FIG. 1 illustrates a block diagram of an information handling system 100 having an improved DC-DC converter, according to an embodiment. The information handling system 100 having the improved DC-DC converter includes a processor 110, a system random access memory (RAM) 120 (also referred to as main memory), a non-volatile ROM 122 memory, a display device 105, a keyboard 125 and an I/O controller 140 for controlling various other input/output devices. For example, the I/O controller 140 may include a keyboard controller, a cursor device controller and/or the serial I/O controller. It should be understood that the term "information handling system" is intended to encompass any device having a processor that executes instructions from a memory medium.

The IHS 100 is shown to include a hard disk drive 130 connected to the processor 110, although some embodiments may not include the hard disk drive 130. In a particular embodiment, the IHS 100 may include additional hard disks. The processor 110 communicates with the system components via a bus 150, which includes data, address and control lines. In one embodiment, the IHS 100 may include multiple instances of the bus 150. A communications device 145, such as a network interface card and/or a radio device, may be connected to the bus 150 to enable wired and/or wireless information exchange between the IHS 100 and other devices (not shown).

In the depicted embodiment, a direct current to direct current converter (DC-DC) converter 180 receives a DC voltage input $V_{cc}$ 188 and provides power to a load, which may include one or more components of the IHS 100 such as the processor 110. In an exemplary, non-depicted embodiment, power desired by the processor 110 may be indicated by a load line. The load line typically indicates a relationship between processor voltage (generally shown on Y-axis) and processor current (generally shown on X-axis). The load line may exhibit a slight downward slope indicating a slight drop in voltage for a large increase in current. In the depicted embodiment, the DC-DC converter 180 includes a controller 182 having an improved hysteretic control to enhance the accuracy of a regulated DC output 184 provided to the one or more components of the IHS 100. Additional detail of the improved DC-DC converter 180 is described with reference to FIG. 2.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. An operating system (OS) of the IHS 100 is a type of software program that controls execution of other software programs, referred to as application software programs. In various embodiments the instructions and/or software programs may be implemented in various ways, including procedure-based techniques, component-based techniques, and/or object-oriented techniques, among others. Specific examples include assembler, C, XML, C++ objects, Java and Microsoft Foundation Classes (MFC).

Figure 2:
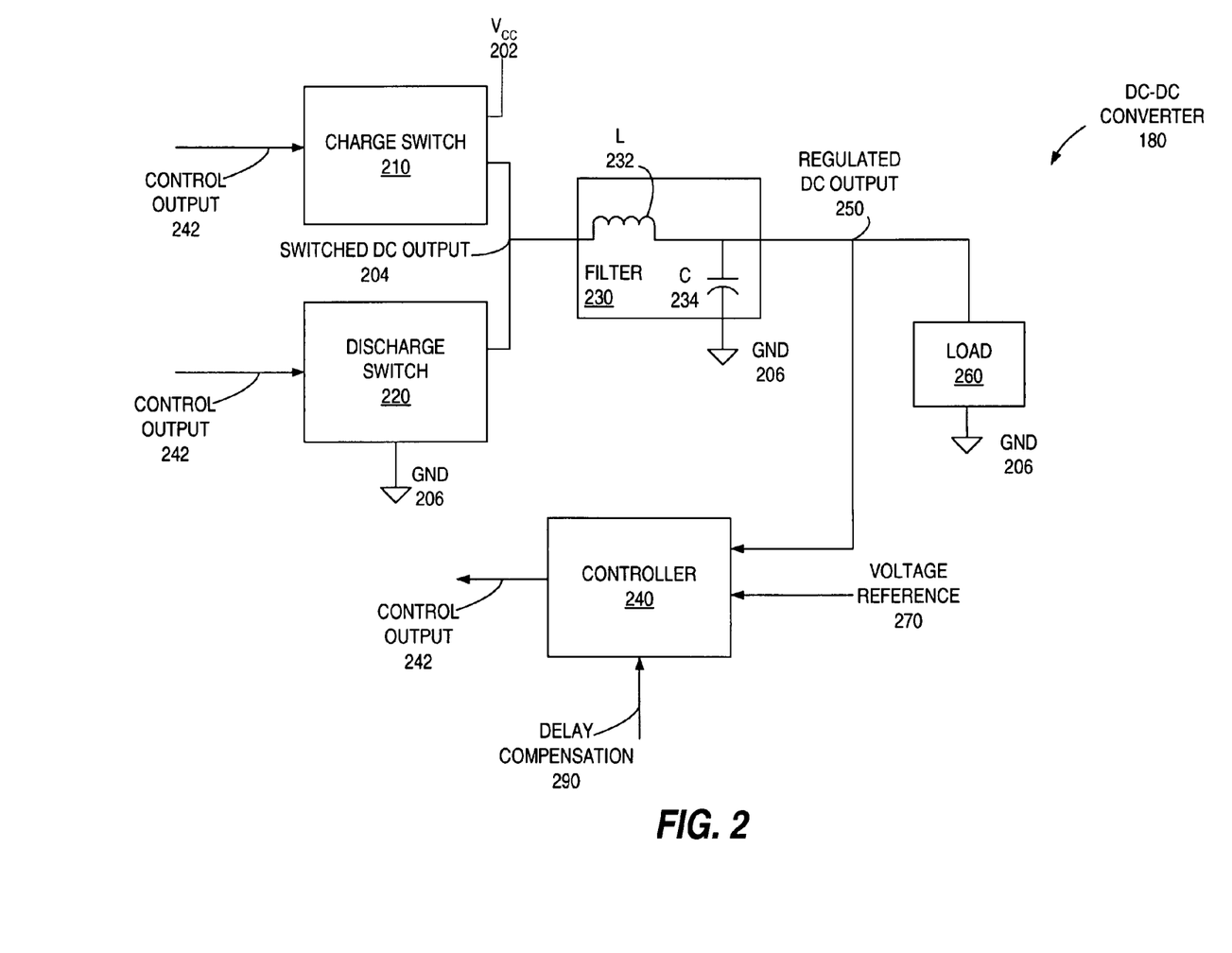
FIG. 2 is a block diagram illustrating further details of an improved DC-DC converter described with reference to FIG. 1, according to an embodiment.

FIG. 2 is a block diagram illustrating further details of an improved DC-DC converter 180 described with reference to FIG. 1, according to an embodiment. In the depicted embodiment, the improved DC-DC converter 180 includes the following components: a charge switch 210, a discharge switch 220, a filter 230 and a controller 240. The DC-DC converter 180 generates a regulated DC output 250 in response to receiving a direct current (DC) voltage input $V_{cc}$ 202. In a particular embodiment, the controller 240 is substantially the same as the controller 182, $V_{cc}$ 188 is substantially the same as the $V_{cc}$ 202, and the regulated DC output 250 is substantially the same as the regulated DC output 184 described with reference to FIG. 1. The charge switch 210 is coupled in between the DC voltage input $V_{cc}$ 202 and a switched DC output 204. The discharge switch 220 is coupled in between the switched DC output 204 and a predefined voltage 206 such as ground. The controller 240 provides a control output 242 to control a duty cycle of the input voltage $V_{cc}$ 202 in response to the regulated DC output 250.

The control output 242 (and/or a complementary signal of the control output 242) controls a duration of an ON and an OFF state of each one of the charge switch 210 and the discharge switch 220, thereby controlling the duty cycle of the input voltage $V_{cc}$ 202. In an embodiment, each one of the charge switch 210 and the discharge switch 220 is a MOSFET device. Duty cycle is generally indicative of time during which a device and/or system is operated. Thus, the duty cycle of the DC-DC converter 180 may be expressed as a ratio or percentage of an ON period to the total (ON+OFF) period. Additional details of the timing aspects of the DC-DC converter 180 are described with reference to FIG. 4.

In the depicted embodiment, the filter 230 filters out a ripple caused as a result of the switching of the charge switch 210 and the discharge switch 220 at least one predefined frequency. Thus, the filter 230 filters out the switched DC output 204 and provides the regulated DC output 250. In a particular embodiment, a load 260 such as the processor 110 (not shown) is coupled in between the regulated DC output 250 and the predefined voltage 206. The filter 230 includes an inductor 232 coupled to the switched DC output 204 and a capacitor 234 coupled in between the regulated DC output 250 and the predefined voltage 206 such as a ground reference. In a particular embodiment, the DC voltage input $V_{cc}$ 202 may vary between approximately 5 volts DC and approximately 12 volts DC, and the regulated DC output 250 may vary between approximately 0.8 volts DC and approximately 1.2 volts DC.

In the depicted embodiment, the controller 240 compares the regulated DC output 250 and a voltage reference 270 to generate the control output 242. In a particular embodiment, the voltage reference 270 is indicative of the voltage desired by the load 260. The voltage value of the reference 270 may be fixed and/or may be dynamically derived from a load line associated with a particular load such as a processor.

As described earlier, a delay in switching each one of the charge and discharge switches 210 and 220 results in increasing an average value of the regulated DC output 250, thereby introducing a DC error. Delays may include propagation delays in the controller 240, turn-on and/or turn-off delays in the switches 210 and 220, and designed dead-time control to prevent shoot through. A delay compensation 290 is added as a predefined time delay to the ON and/or OFF time to selectively adjust the duty cycle. The delay compensation 290 lowers the average of the regulated DC output 250 by an amount to offset the increase, thereby substantially eliminating the DC error. In an exemplary, non-depicted embodiment, a high trip point and a low trip point for performing the hysteretic control may be controlled to adjust the duty cycle. Additional details of the controller 240 are described with reference to FIG. 3.

The various embodiments virtually eliminate the output capacitance thereby enabling the DC-DC converter 180 to eliminate the need for having a large value for the capacitance 234. Thus, lower profile ceramic capacitors may be utilized to advantageously save layout space, enable placement in low height constrained areas similar to applications close to the processor 100 with heat sinks, and reduce the cost of capacitors.

Figure 3:
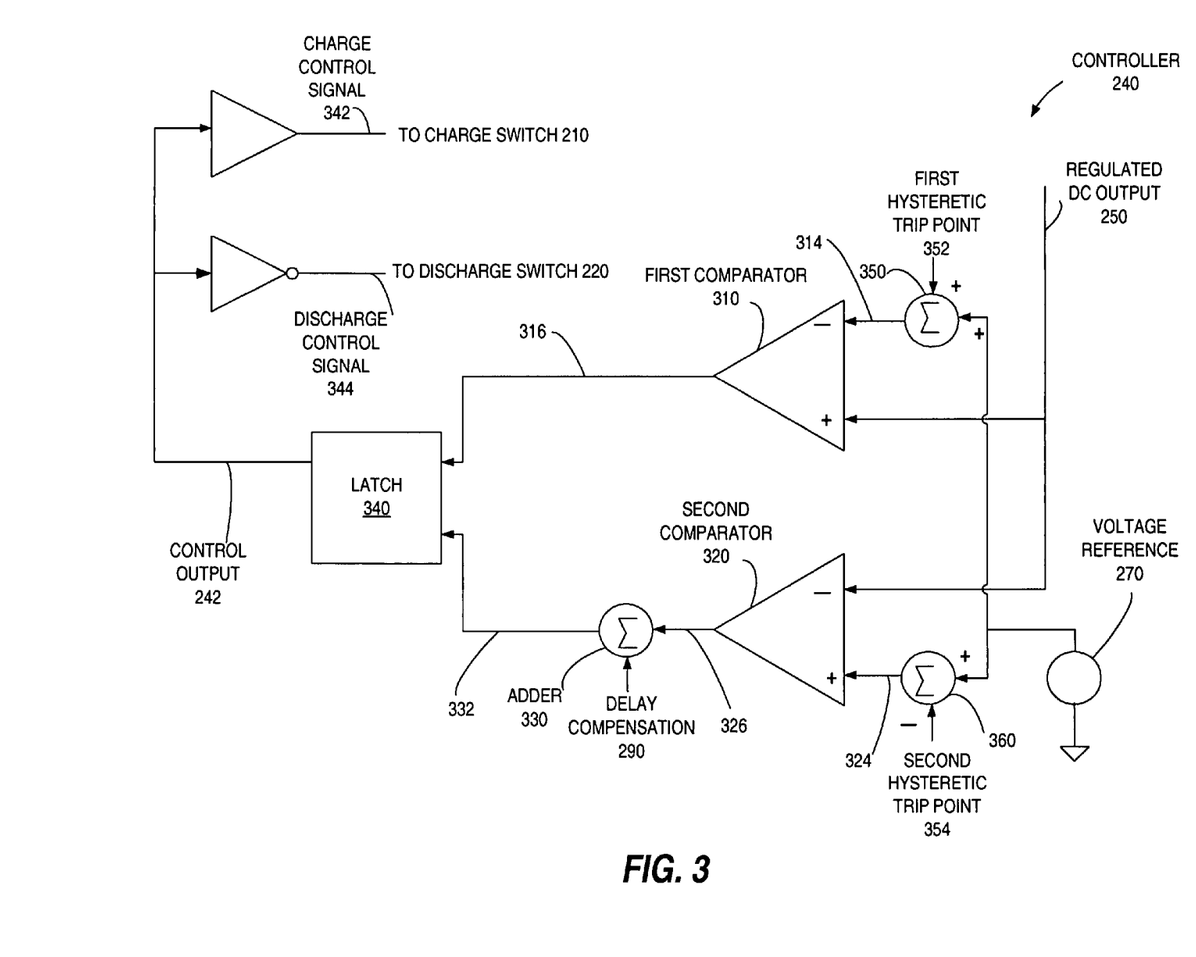
FIG. 3 is a block diagram illustrating further details of a controller described with reference to FIG. 2, according to an embodiment.

FIG. 3 is a block diagram illustrating further details of a controller 240 described with reference to FIG. 2, according to an embodiment. In the depicted embodiment, the controller 240 includes a first comparator 310, a second comparator 320, an adder 330, and a latch 340. The regulated DC output 250 is provided as an input to the first comparator 310 and the second comparator 320. The latch 340 generates the control output 242.

A high trip point adder 350 adds the voltage reference 270 and a first hysteretic trip point 352 to provide a first input 314 to the first comparator 310. Thus, the first input 314 is indicative of the first hysteretic trip point 352. A low trip point adder 360 subtracts a second hysteretic trip point 354 from the voltage reference 270 to provide a second input 324 to the second comparator 320. In a particular embodiment, each one of the first hysteretic trip point 352 and the second hysteretic trip point 354 may be changed to adjust the duty cycle. In an exemplary, non-depicted embodiment, computations for the first hysteretic trip point 352 and the second hysteretic trip point 354 may be performed externally (external to the controller 240). Additional details for computing a particular value for the second hysteretic trip point 354 to substantially eliminate the DC error are described with reference to FIG. 4.

The first comparator 310 generates a first output 316 in response to a difference between the regulated DC output 250 and the first input 314. That is, the first output 316 is high when the regulated DC output 250 is greater than the first input 314. The second comparator 320 generates a second output 326 in response to a difference between the second input 324 and the regulated DC output 250. That is, the second output 326 is high when the regulated DC output 250 is less than the second input 324. The delay compensation 290 is added to the second output 326 in the adder 330 to generate a delayed second output 332. In an exemplary, non-depicted embodiment, dynamic computations for delay compensation 290 may be performed externally (external to the controller 240). As described earlier, the delay compensation 290 lowers the average of the regulated DC output 250 by the same amount as the increase, thereby substantially eliminating the DC error. Additional details for dynamically computing a particular value for the delay compensation 290 to substantially eliminate the DC error are described with reference to FIG. 4.

In the depicted embodiment, the latch 340 generates the control output 242 in response to receiving the first output 316 and the delayed second output 332. In a particular embodiment, the latch 340 is a set-reset flip flop. The control output 242 is provided to the charge switch 210 as a charge control signal 342 and to the discharge switch 220 as a discharge control signal 344, which is complementary to the charge control signal 342.

In the depicted embodiment, when the regulated DC output 250 is greater than the first input 314 then the first output 316 is set to high. When the first output 316 used as a reset input to the latch 340 is set to high, the control output 242 is low, the charge switch 210 is OFF and the discharge switch 220 is ON. Similarly, when the regulated DC output 250 is less than the second input 324 then the second output 326 is high and the delayed second output 332 is high. When the delayed second output 332 used as a set input to the latch 340 is set to high, the control output 242 is high, the charge switch 210 is ON and the discharge switch 220 is OFF.

Figure 4:
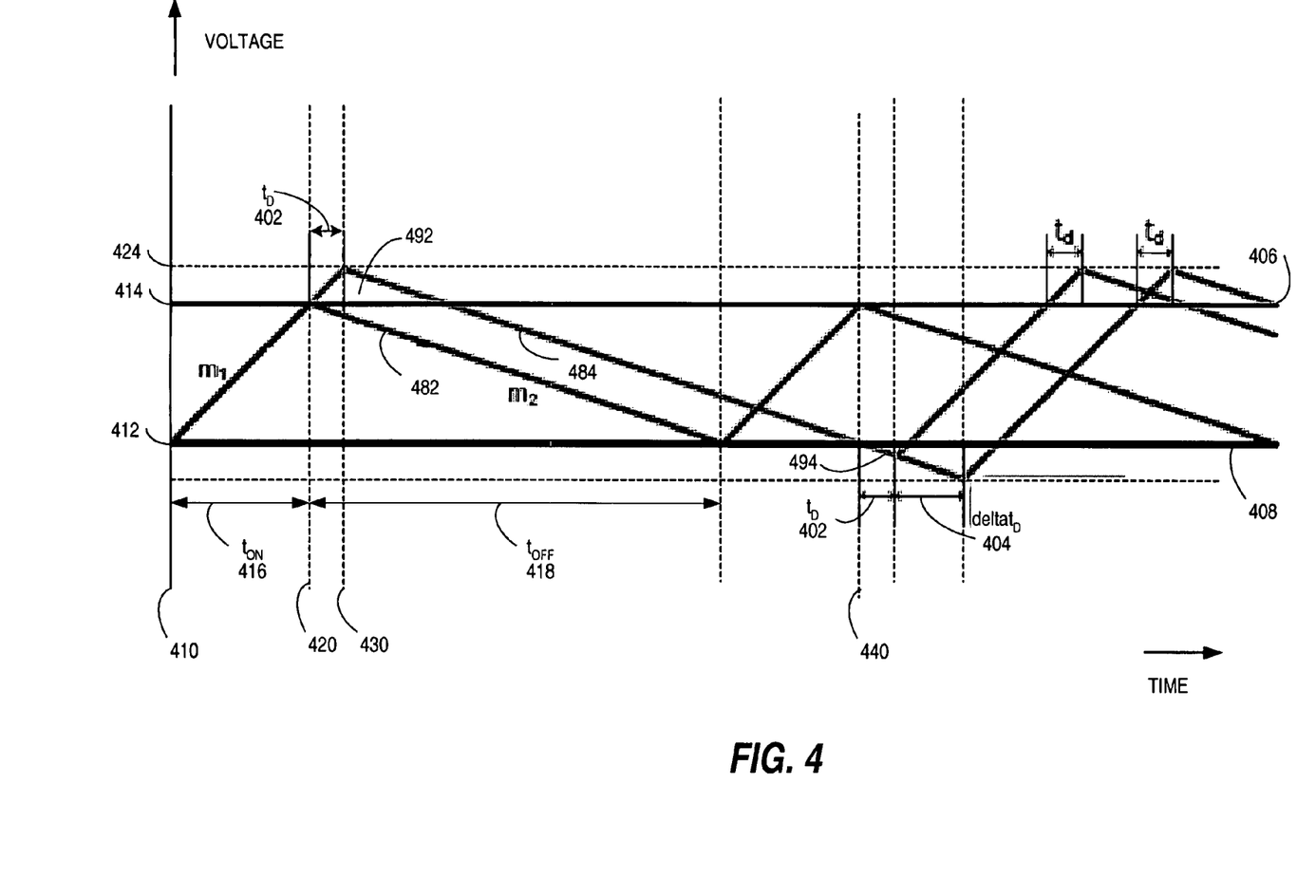
FIG. 4 illustrates waveforms associated with the DC-DC converter described with reference to FIG. 1, according to an embodiment.

FIG. 4 illustrates waveforms associated with the DC-DC converter 180 described with reference to FIG. 1, according to one embodiment. In this illustration, viewed in conjunction with FIG. 2 and FIG. 3, at time $t=t_0$ 410, the charge switch 210 is closed (ON state) and a charge current flowing through the charge switch 210 increases from an initial value $I_1$ 412 to an increased value of $I_2$ 414 amps. The particular values for $I_1$ 412 and $I_2$ 414 may be defined by a low hysteretic point 408 and a high hysteretic point 406. A time duration for which the charge current continues to increase is a $t_{ON}$ 416 period of the duty cycle. A slope $m_1$ for the charge current is approximately equal to $(V_{in}-V_0)/L$, where $V_{in}$ is equal to $V_{cc}$ 202, $V_0$ is equal to the regulated DC output 250, and L is the inductor 232.

At time $t_1$ 420 a control signal is asserted to open (OFF state) the charge switch 210. In a particular embodiment, no delays exist and at time $t_1$ 420 the discharge switch 320 is closed (ON state). A discharge current flowing through the discharge switch 320 decreases from an initial value $I_2$ 414 to decreased value of $I_1$ 412 and is illustrated by waveform 482. A time duration for which the discharge current continues to decrease is a $t_{OFF}$ 418 period of the duty cycle. As described earlier, the duty cycle is defined by the ratio $(t_{ON}$ 416$)/(t_{ON}$ 416+$t_{OFF}$ 418). A slope $m_2$ for the discharge current is approximately equal to $V_0/L$, where $V_0$ is equal to the regulated DC output 250 and L is the inductor 232. Because $V_{in}$ is generally greater than $V_0$ by a factor of 2 or higher, the slope $m_1$ is generally greater than slope $m_2$.

In a particular embodiment, due to existence of various types of delays described earlier, an opening of the charge switch 210 is delayed by a delay $t_d$ 402. That is, the charge switch 210 actually opens at time ($t_1$ 420+$t_d$ 402) instead of at time $t_1$ 420. In this embodiment, the time duration for which the charge current continues to ramp up or increase is extended to ($t_{ON}$ 316+$t_d$ 402). At time $t_2$ 430, which is the same as ($t_1$ 420+$t_d$ 402), the discharge switch 220 is closed (ON state). The discharge current flowing through the discharge switch 220 decreases from an initial value $I_3$ 424 to the decreased value of $I_1$ 412 at time $t_4$ 440 and is illustrated by waveform 484. Due to the delay $t_d$ 402 in closing the discharge switch 220, the time duration for which the discharge current continues to ramp down or decrease is extended to ($t_4$ 440+$t_d$ 402). Due to the mismatch in slopes $m_1$ and $m_2$, the area of a first triangle 492 above the high hysteretic point 406 is greater than an area of a second triangle 494 below the low hysteretic point 408. This causes a DC error when there is no delay compensation, e.g., when the delay compensation 290 is set to zero.

For the DC error to be substantially eliminated, the first triangle 492 above the high hysteretic point 406 must be substantially offset by a matching area located below the low hysteretic point 408. The area of a second triangle 494 is advantageously increased by introducing an additional time delay to open the discharge switch 220 at time ($t_4$ 440+$t_d$ 402+delta$t_d$ 404) instead of ($t_4$ 440+$t_d$ 402), where delta$t_d$ 404 is the additional time delay defined by the delay compensation 290.

In the depicted embodiment, the time duration for which the discharge current continues to decrease is further extended to ($t_4$ 440+$t_d$ 402)+delta$t_d$ 404. This results in decreasing an average value of the regulated DC output 250 to substantially offset an increase in the average value of the regulated DC output 250 without the delay compensation 290. In a particular embodiment, where the regulated DC output 250 is equivalent series resistance (ESR) dominated, the value of the delta$t_d$ 404 is dynamically computed per equation 100 by equating areas of the triangles above the high hysteretic point 406 and below the low hysteretic point 404.

$$m_1 * t_d = m_2 * (t_d + \text{delta} t_d) \quad \text{Equation 100}$$

Hence, calculating for delta$t_d$ 404

$$\text{delta} t_d = (m_1 - m_2) * t_d / m_2 \quad \text{Equation 200}$$

In a particular embodiment, a value of $t_d$ 402 may be estimated for switches and other circuit components. In an embodiment, each component may have a corresponding value for $t_d$ 402. That is, the charge switch 210 may have a first time delay factor and the discharge switch 220 may have a second time delay factor. Thus, by knowing $m_1$, $m_2$ and $t_d$, values for delta$t_d$ 404 may be dynamically computed and stored in memory, calculated from a lookup table, and/or received from an external source.

In a particular embodiment, the DC error may be substantially eliminated by adjusting a voltage value of the lower hysteretic trip point instead of introducing the actual additional delay delta$t_d$ 404 defined by the delay compensation 290. An adjusted value for the second hysteretic trip point 354 to substantially eliminate the DC error is computed per equation 300

$$\text{original} + m_2 * \text{delta} t_d \quad \text{Equation 300}$$

where 'original' represents an initial value before the delay compensation. Substituting for delta$t_d$ per equation 200, the adjusted value for the second hysteretic trip point 354, per equation 400, is $$\text{original} + (m_1 - m_2) * t_d \quad \text{Equation 400}$$

In this embodiment, the adder 330 may be bypassed or the delay compensation 290 may be set to zero.

Figure 5:
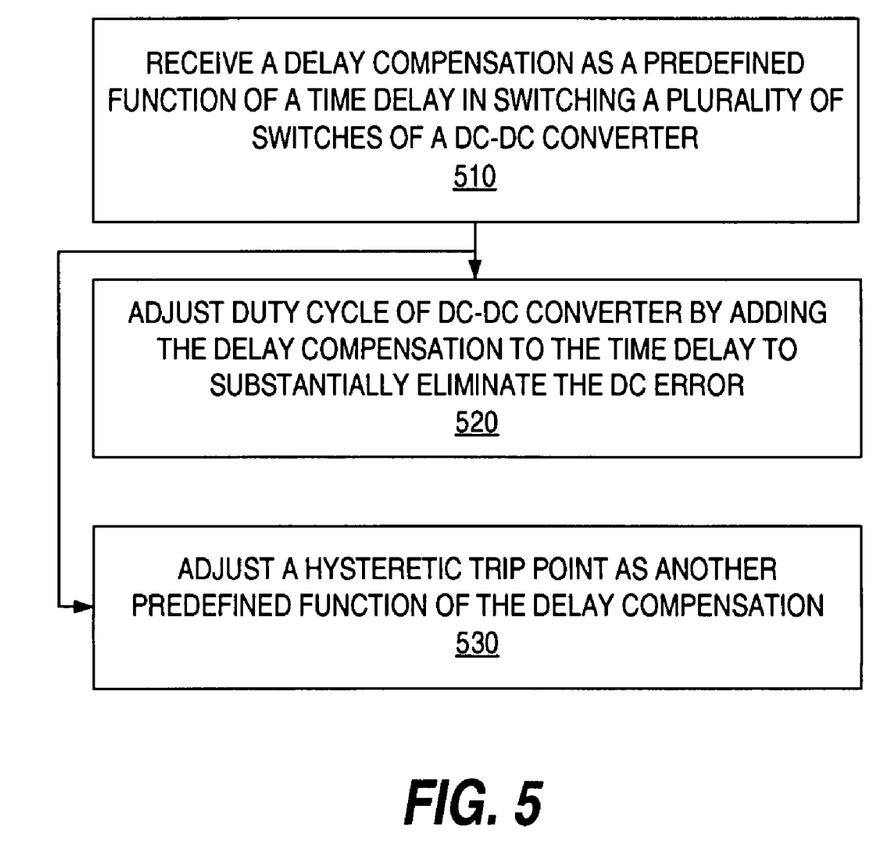
FIG. 5 is a flow chart illustrating a method for controlling a direct current to direct current (DC-DC) converter, according to an embodiment.

FIG. 5 is a flow chart illustrating a method for controlling a direct current to direct current (DC-DC) converter, according to an embodiment. In a particular embodiment, the DC-DC converter is the converter 180 described with reference to FIG. 1. In step 510, a delay compensation is received as a predefined function of a time delay in switching a plurality of switches included in the DC-DC converter. In a particular embodiment, the delay compensation is computed external to a controller. In step 520, a duty cycle of the DC-DC converter is adjusted by adding the delay compensation to the time delay to substantially eliminate the DC error.

Various steps described above may be added, omitted, combined, altered, or performed in different orders. In a particular embodiment, the DC error may be substantially eliminated by adjusting a lower hysteretic trip point to introduce a time delay equivalent to the actual additional delay delta$t_d$ defined by the delay compensation, as described in step 530. In step 530, a hysteretic trip point of the DC-DC converter is adjusted to control the duty cycle. In a particular embodiment, the hysteretic trip point is adjusted as another predefined function of the delay compensation to substantially eliminate the DC error. In this embodiment, the step 520 is bypassed.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, it should be understood that while the charge and discharge switches have the same time delay td, it would be within the spirit and scope of the disclosures herein to encompass an embodiment deploying the charge switch having a time delay td1 and the discharge switch having a time delay td2.

The methods and systems described herein provide for an adaptable implementation. Although certain embodiments have been described using specific examples, it will be apparent to those skilled in the art that the disclosure is not limited to these few examples. The benefits, advantages, solutions to problems, and any element(s) that may cause any benefit, advantage, or solution to occur or become more pronounced are not to be construed as a critical, required, or an essential feature or element of the present disclosure.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A direct current to direct current (DC-DC) converter comprising:
    a charge switch coupled in between a direct current (DC) voltage input and a switched DC output, wherein the charge switch is switchable to control a duty cycle of the DC voltage input;
    a discharge switch coupled in between the switched DC output and a predefined voltage, wherein the discharge switch is switchable to control the duty cycle;
    a filter to filter out at least one predefined frequency of the switched DC output and provide a regulated DC output; and
    a controller to control the duty cycle, wherein a corresponding delay in switching each one of the charge and discharge switches results in a DC error in the regulated DC output, wherein the controller adjusts the duty cycle of a hysteretic controller by adding a delay compensation downstream of the hysteretic controller to substantially eliminate the DC error.

2. The converter of claim 1, wherein the controller includes:
   a first comparator providing a first output in response to the regulated DC output and a first input, the first input being indicative of a first hysteretic trip point;
   a second comparator providing a second output in response to the regulated DC output and a second input, the second input being indicative of a second hysteretic trip point;
   an adder providing a delayed second output in response to adding the delay compensation to the second output; and
   a latch providing a control output to control the duty cycle in response to the first output and the delayed second output.

3. The converter of claim 2, wherein the first input is derived by adding a voltage reference source to the first hysteretic trip point.

4. The converter of claim 2, wherein the second input is derived by subtracting the second hysteretic trip point from a voltage reference source.

5. The converter of claim 2, wherein the charge switch is off and the discharge switch is on when the first output is high, wherein the first output is high when the regulated DC output is greater than the first input.

6. The converter of claim 2, wherein the charge switch is on and the discharge switch is off when the delayed second output is high, wherein the delayed second output is high when the regulated DC output is less than the second input.

7. The converter of claim 2, wherein the adder is bypassed and the second hysteretic trip point is adjusted to result in a duty cycle that is substantially equal to the duty cycle with the delay compensation.

8. The converter of claim 2, wherein the latch is a set-reset flip-flop.

9. The converter of claim 2, wherein the control output includes a charge control signal provided to the charge switch and a discharge control signal provided to the discharge switch, wherein the charge control signal and the discharge control signal respectively control an operating state of the charge switch and the discharge switch.

10. The converter of claim 1, wherein the delay compensation substantially eliminates the DC error by decreasing an average value of the regulated DC output to offset an increase in the average value of the regulated DC output without the delay compensation.

11. The converter of claim 1, wherein the delay compensation is computed as a function of a load current.

12. The converter of claim 1, wherein the regulated DC output is provided to a processor included in an information handling system (IHS).

13. A method for controlling a direct current to direct current (DC-DC) converter, the method comprising:
   receiving a delay compensation as a predefined function of a time delay in switching a plurality of switches included in the DC-DC converter, wherein the time delay results in a DC error in a regulated output of the DC-DC converter; and
   adjusting a duty cycle of the DC-DC converter by an addition of the delay compensation downstream of a hysteretic controller to substantially eliminate the DC error by a dynamically calculated correction factor.

14. The method of claim 13, comprising:
   adjusting a hysteretic trip point of the DC-DC converter to control the duty cycle, wherein the hysteretic trip point is adjusted as another predefined function of the delay compensation to substantially eliminate the DC error.

15. The method of claim 14, comprising:
   bypassing the addition of the delay compensation.

16. The method of claim 13, wherein the delay compensation is stored in a memory.

17. The method of claim 13, wherein the predefined function is computed as a difference of slopes divided by a discharge current slope, wherein the difference of slopes is the discharge current slope subtracted from a charge current slope.

18. An information handling system (IHS) comprising:
   a processor; and
   a direct current to direct current (DC-DC) converter to provide a current to the processor, wherein the converter includes:
   a charge switch coupled in between a direct current (DC) voltage input and a switched DC output, wherein the charge switch is switchable to control a duty cycle of the DC voltage input;
   a discharge switch coupled in between the switched DC output and a predefined voltage, wherein the discharge switch is switchable to control the duty cycle;
   a filter to filter out at least one predefined frequency of the switched DC output and provide a regulated DC output to the processor; and
   a controller to control the duty cycle, wherein a corresponding delay in switching each one of the charge and discharge switches results in a DC error in the regulated DC output, wherein the controller adjusts the duty cycle of a hysteretic controller by adding a delay compensation downstream of the hysteretic controller to substantially eliminate the DC error by a dynamically calculated correction factor.

19. The system of claim 18, wherein the controller includes:
   a first comparator providing a first output in response to the regulated DC output and a first input, the first input being indicative of a first hysteretic trip point;
   a second comparator providing a second output in response to the regulated DC output and a second input, the second input being indicative of a second hysteretic trip point;
   an adder providing a delayed second output in response to adding the delay compensation to the second output; and
   a latch providing a control output to control the duty cycle in response to the first output and the delayed second output.

20. The system of claim 19, wherein the adder is bypassed and the second hysteretic trip point is adjusted to result in a duty cycle that is substantially equal to the duty cycle with the delay compensation.

* * * * *